United States Patent [19]

Weiss

[11] Patent Number: 4,864,730

[45] Date of Patent: Sep. 12, 1989

[54] ELECTRIC RING CUTTER

[75] Inventor: Ronald D. Weiss, 24 Dunbarton Dr., Nashua, N.H. 03063

[73] Assignees: Ronald D. Weiss; Frederick J. Alter, both of Nashua, N.H.

[21] Appl. No.: 172,640

[22] Filed: Mar. 24, 1988

[51] Int. Cl.[4] .............................................. B23D 47/04
[52] U.S. Cl. ...................................... 30/378; 30/124; 30/276
[58] Field of Search ................. 30/124, 276, 370, 378, 30/388, 390

[56] References Cited

U.S. PATENT DOCUMENTS

| 326,327 | 9/1885 | Pickett. | |
|---|---|---|---|
| 328,154 | 10/1885 | Thomas | 30/276 X |
| 653,557 | 7/1900 | Jenkins | 30/276 X |
| 1,867,342 | 7/1932 | Wieg. | |
| 2,406,744 | 9/1946 | Cryar | 30/370 |
| 2,595,145 | 4/1952 | Jensen | 30/182 |
| 2,608,748 | 9/1952 | Kirkwood | 29/75 |
| 2,614,322 | 10/1952 | Pendleton | 30/179 |
| 2,660,786 | 12/1953 | Loyd | 30/182 |
| 4,135,299 | 1/1979 | Moriarty | 30/182 |

FOREIGN PATENT DOCUMENTS 143477  5/1920  United Kingdom ................. 30/378

OTHER PUBLICATIONS

"The Solution", Beaver Surgical Products, Product Identification No. 4151, Waltham, Massachusetts.

Primary Examiner—Douglas D. Watts
Assistant Examiner—Michael D. Folkerts
Attorney, Agent, or Firm—Weingarten, Schurgin, Gagnebin & Hayes

[57] ABSTRACT

A tool for cutting a ring while the ring is lodged on a finger. The tool comprises a housing upon which a pivot arm and a motor driven circular saw blade are mounted. The tool is put to use by placing one end of the pivot arm under the ring and applying thumb pressure to the opposite end of the pivot arm to draw the rotating blade toward the ring. The blade is mounted on a high-mass, heat-conductive drive shaft which acts to dissipate the heat produced by the cutting action of the tool. Electrical cut off means are provided to turn the drive motor off when the blade has cut through the ring.

3 Claims, 3 Drawing Sheets

ELECTRIC RING CUTTER

FIELD OF THE INVENTION

This invention relates generally to a device for removing finger rings and more specifically to an electrically powered high speed ring cutter.

BACKGROUND OF THE INVENTION

Situations often call for a tool for cutting a ring in order to remove it from a finger. For example, under emergency circumstances, where a finger is swollen, inflamed, or otherwise injured, a tool is necessary to cut the ring so that it can be spread open and removed from the finger. Even non-emergency situations require such a tool.

While a simple saw could accomplish this task, such a crude method would be slow and awkward and would pose an obvious danger to the finger and hand. Other relatively unrefined tools that have been designed to accomplish this task have disadvantages because they exert undue pressure on an already injured finger or they create heat which is dissipated through the ring, thereby causing greater discomfort on the finger.

SUMMARY OF THE INVENTION

The present invention is a tool designed to cut a ring while lodged on a finger through the use of a motor-driven circular saw blade. The tool comprises an elongated housing containing an electrical motor and a heat absorbing drive shaft with a high speed circular saw blade mounted to this shaft. The drive shaft is high in mass and made of a heat conductive material which provides a medium to dissipate the heat produced by the action of the saw blade cutting into the ring.

The housing is provided with a pivoting lever arm which holds the ring in place and acts as a pivot point for applying pressure against the ring through the saw blade. As a safety feature, the lever arm engages a cut-off microswitch when it is extended to the point where it should be completely through the ring.

DESCRIPTION OF THE DRAWINGS

Other features and advantages of the invention will be apparent from the following description in conjunction with the accompanying drawings wherein.

DETAILED DESCRIPTION OF THE INVENTION

Figure 1:
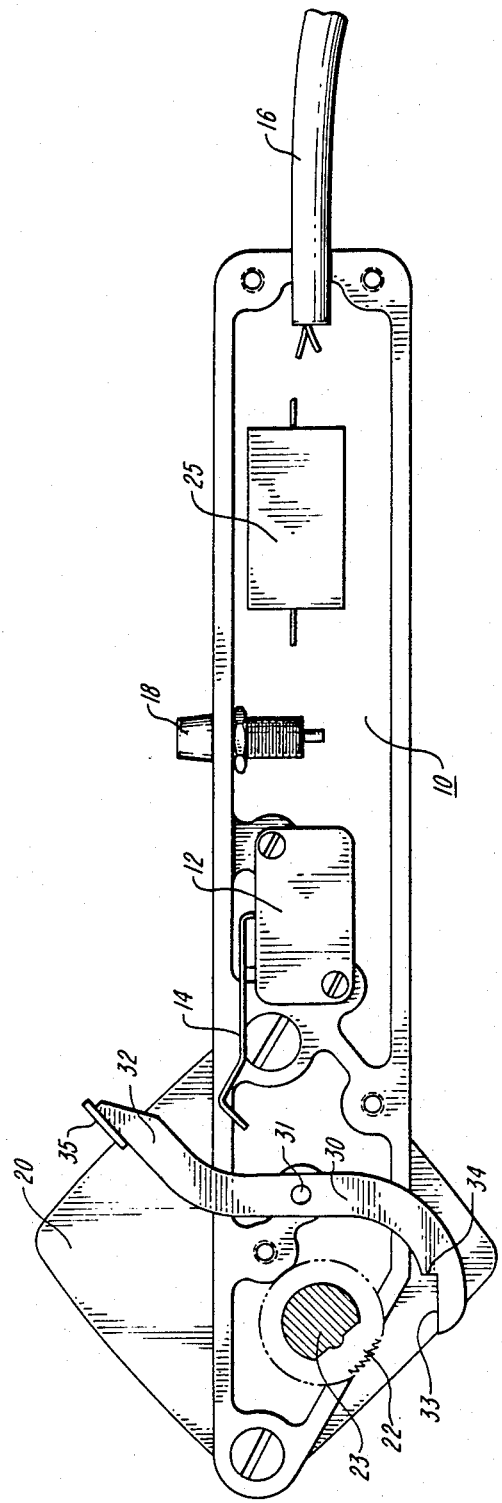
FIG. 1 shows a cross-sectional side view of the invention.
Figure 2:
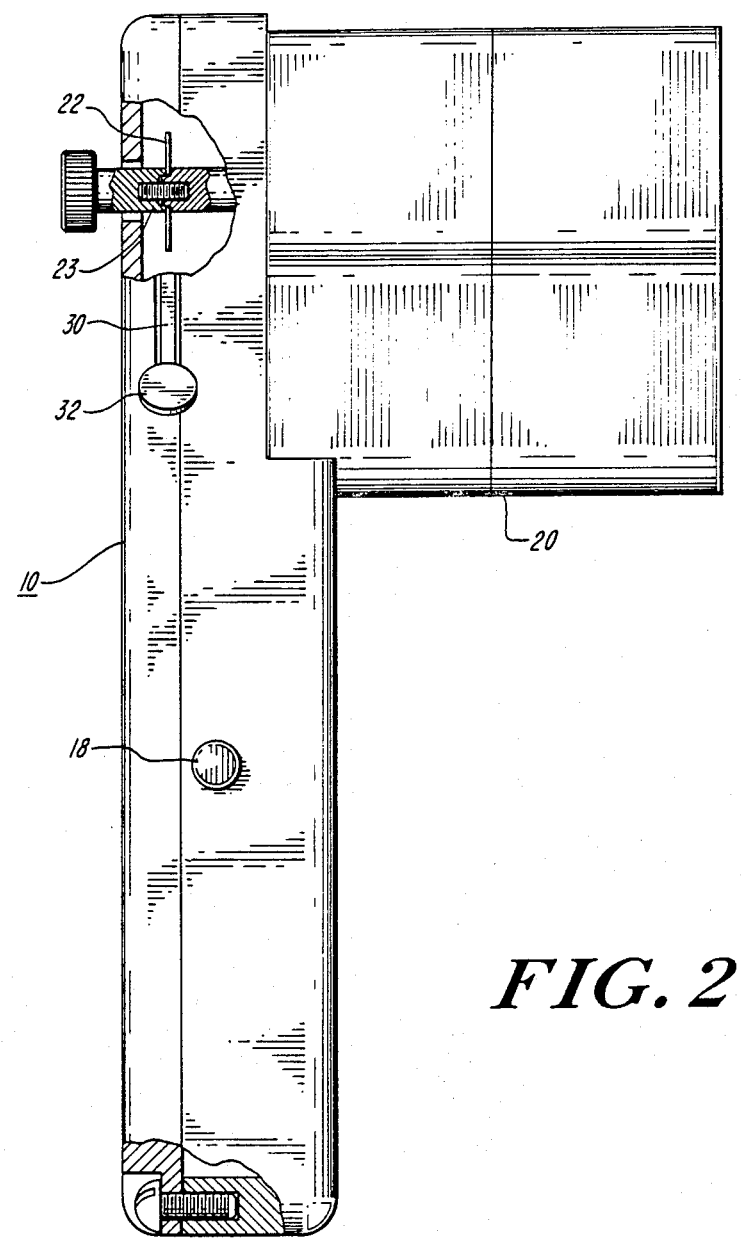
FIG. 2 shows a top view of the invention with cross-sectional cutaways.
Figure 3:
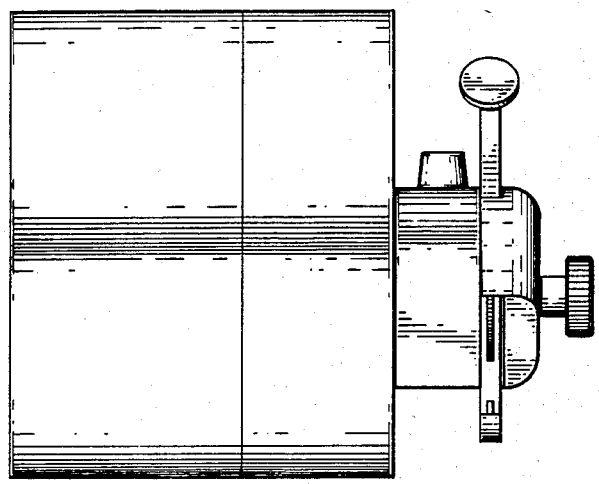
FIG. 3 shows a front view of the invention.
Figure 4:
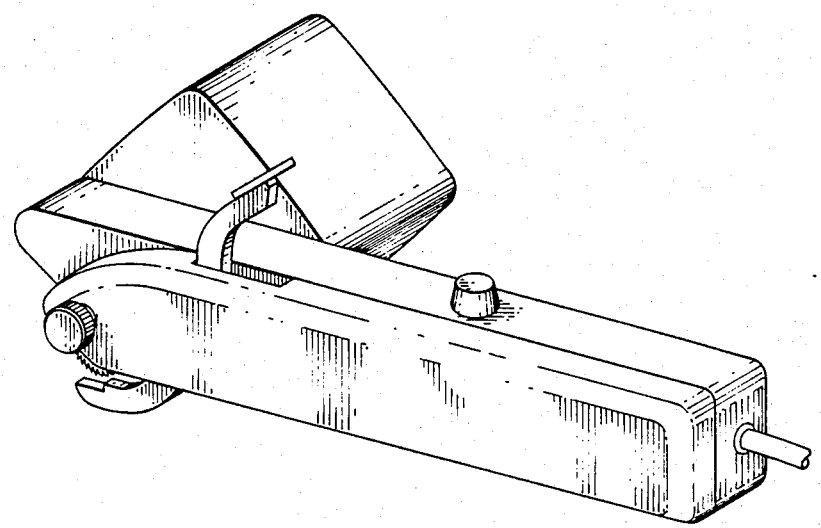
FIG. 4 shows a perspective view of the invention.

Referring to the drawings, FIGS. 1-4 illustrate a typical embodiment of the present invention. The ring cutting tool is indicated generally in FIG. 1 comprising an elongated housing 10 adapted to contain a high speed electrical drive motor 20 with starting capacitor 25 and a pivoting lever arm 30. In the normal ring cutting procedure, a motor driven rotatable saw blade 22 is guided by the lever arm 30 against a ring segment from a direction perpendicular to the plane of the ring.

The lever arm 30, comprising a butted end 32 and an indented end 33, is pivotably fastened to the housing 10 at pivot point 31. The location of pivot point 31 is substantially in the center of the lever arm such that the application of downward pressure to the butted end 32 will draw the indented end 33 upward toward the saw blade 22. Indented end 33 contains a squared notch 34 which acts to support the ring and maintain the ring in a steady position during the cutting operation. Butted end 32 is comprised of a small seat 35 which allows the user to apply pressure to the butted end 32. Thus, in normal operation, the indented end 33 of the lever arm 30 is placed between the ring and the finger and downward pressure is applied to the butted end 32 of the lever arm 30 in order to draw the rotating saw blade 22 toward the ring until it comes in contact with and passes through the ring.

The high speed cutting operation of the present invention can cause discomfort due to the heat created in the ring as a function of the energy expended upon it. In order to minimize the effect of this heat buildup, the drive shaft 23 which connects the drive motor 20 to the saw blade 22 is also designed to act as a heatsink to draw heat away from the ring. This feature is accomplished by using a blade shaft which is high in mass and is made of a heat conductive material which draws the heat away from the cutting site. Additionally, this blade shaft design allows the cutting blade to be exchanged easily and to be firmly secured to the shaft so that it will not rotate during the cutting operation.

The present invention further comprises a means for accessing a standard electrical outlet 16, a blade operative indicator light 18 and an electrical cut-off switch 12. The cut-off switch 12 acts as a safety feature in order to disengage electrical power when the saw blade has cut through the ring. Cut-off switch 12 is activated when the butted end 32 presses down on switch arm 14 which occurs when the indented end 33 meets with saw blade 22.

It will further be appreciated that various changes may be made to the ring cutter as above set forth. It will be understood that all matter herein described or shown in the accompanying drawings is to be interpreted as illustrative only and is not to limit the invention.

What is claimed is:

1. A ring cutting device for cutting a ring while lodged on a human finger for removing the ring from the finger, comprising:

an elongated housing having a cutting end, wherein said housing fits comfortably in the palm of a user's hand;

a circular saw blade rotatably mounted on a shaft close to said cutting end of said housing;

a high speed electric motor for rotating said circular saw blade;

a lever arm comprising a pivot point, a first end adapted to be inserted between a finger and a ring in order to hold the ring in place when the ring is being cut, and a second end adapted for applying pressure while the device is in use, said lever arm being pivotally mounted on said housing at said pivot point such that said circular saw blade is moved into engagement with the ring when said first end is inserted between the finger and the ring and pressure is applied to said second end; and a cut-off switch mounted on said housing for disengaging power to said electrical motor when activated, said switch becoming activated when said first end of said pivot arm makes contact with said circular saw blade.

2. The ring cutting device of claim 1, wherein said rotatable saw blade is mounted on a shaft made of thermally conductive material to allow for heat dissipation through the shaft.

3. The ring cutting device of claim 1, wherein said circular saw blade is made of high speed steel to allow for cutting through execptionally hard alloys.

* * * * *